Patented Aug. 7, 1934

1,969,098

UNITED STATES PATENT OFFICE 1,969,098

METAL-CONTAINING NONDYEING THIO-DERIVATIVE FROM PHENOLS AND PROCESS OF PREPARING THE SAME

Ernst Rünne and Karl Larbig, Frankfort-on-the-Main-Hochst, Germany, assignors to General Aniline Works, Inc., New York, N. Y., a corporation of Delaware No Drawing. Application January 26, 1932, Serial No. 589,054. In Germany January 26, 1931

9 Claims. (Cl. 260—18)

Our present invention relates to new metal-containing non-dyeing thioderivatives from phenols and to a process of preparing the same, more particularly it relates to new condensation products obtainable by causing a halogen-sulfur compound, such as sulfur monochloride or sulfur dichloride, to act on phenols or homologues or substitution products thereof, such as cresols, chlorophenols and the like, or naphthols or substitution products thereof, in the presence of tin or antimony or a tin or antimony compound.

It is known that by causing halogensulfur compounds, such as sulfur monochloride, to react with phenols or homologues or substitution products thereof or with naphthols there are obtained resinous condensation products which are easily absorbed, from a weakly alkaline aqueous solution, by undyed textile fibers and by substrata, such as alumina etc., and act as mordants for fixing basic dyes on the said materials. If desired, the said known condensation products may be aftertreated by alkali metal sulfites or strong sulfuric acid or other agents having an oxidizing action, such as air, hydrogen peroxide and the like, according to known methods.

We have now found that metal-containing non-dyeing condensation products of much stronger fixing power are obtainable if the said reaction between a halogen-sulfur compound and a phenol or naphthol is carried out in the presence of tin or antimony or a tin or antimony compound. We have further found that condensation products of similarly good properties are obtained by first causing a halogen-sulfur compound to react with a phenol or a homologue or substitution product or a naphthol according to the known method (compare, for instance, German Patents Nos. 389,360 and 399,898) and subsequently treating the thus obtained thioderivative with tin or antimony or a tin or antimony compound.

It is surprising that the above described new processes yield metal-containing thiocondensation products and that the said metals or metal compounds are at all capable of forming such metal containing thiocompounds, the more so as hitherto the reactions between an organic compound and a halogensulfur compound, to form sulfur dyestuffs or non-dyeing sulfurized phenols being mordants, has never been carried out in the presence of a metal or metal compound. Nor could it be foretold whether the new metal-containing thioderivatives obtainable according to our aforesaid methods would have any other or different or more favorable effects as mordants than those obtainable from phenols and halogen-sulfur compounds without the said metals and metal compounds.

As metals or metal compounds there may be used in the present process tin or tin compounds, such as stannous chloride, stannic chloride, tin stannate, antimony or antimony compounds, such as antimony trichloride, or complex compounds or oxides and hydroxides of tin and antimony or other compounds of the said metals.

The reaction to form the resinous thiocompounds may, besides the addition of the metal or metal compound, otherwise be carried out according to the known methods, for instance, in the presence or absence of water, solvents or diluents, catalytically acting substances, such as iodine, etc. Thereupon, the condensation products, thus obtained, may be dissolved or aftertreated with alkalies. The proportions in which the phenols, halogensulfur compounds, the auxiliary products, the metals and metal compounds are used may vary within wide limits. The eventually necessary or desired aftertreatment of the metal-containing thioderivatives by means of alkali metal sulfites, oxidizing agents, strong sulfuric acids and other agents may also take place in accordance with the known aftertreating methods applied to the simple condensation products from phenols and halogen-sulfur compounds.

As stated before the new metal-containing condensation products are effective mordants for fixing basic dyes on textile materials, particularly on cotton. They may furthermore be used for tanning purposes and as highly effective resist agents for preventing silk and wool from taking up dyestuffs. When dyeing, for instance, mixed fabrics made of wool and cotton with substantive cotton dyes in the presence of the new metal-containing condensation products, the wool is reserved and remains substantially or wholly undyed. The known condensation products prepared without the addition of the above mentioned metals or metal compounds are less effective when used as resist agents.

The following examples serve to illustrate the invention, but they are not intended to limit it thereto, the parts being by weight:

(1) 54 parts of phenol are melted. A mixture of 50 parts of sulfur monochloride and 20 parts of stannic chloride is slowly added thereto, drop by drop. The whole is stirred in heat (at about 50° C. to about 100° C.) for some time and then 100 parts of caustic soda solution of 35% strength are slowly added. The product, thus obtained, is soluble in water and may directly be used as mordant or resist agent. The resist action, for instance, is very strong and does not depend on the temperature of the dye bath.

(2) 50 parts of sulfur monochloride are gradually introduced, drop by drop, into a mixture of 54 parts of raw cresol and 15 parts of antimony trichloride. The further treatment is effected as stated in Example 1.

(3) 82 parts of phenol are treated with 54 parts of sulfur monochloride and 15 parts of antimony trichloride as stated in Example 2. Thereupon, 44 parts of oleum of 20% strength are added to the mixture, and the whole is heated for some hours up to 210° C. The product obtained is easily soluble in sodium carbonate and is capable of fixing basic dyestuffs, for instance, on cotton, more effectively than the corresponding product prepared without the addition of antimony trichloride.

(4) 20 parts of stannous chloride are suspended in 54 parts of molten phenol. 70 parts of sulfur monochloride are added drop by drop, the whole is stirred for some time in the heat (at a temperature of about 50° C. to about 100° C.) and 100 parts of caustic soda solution of 35% strength are slowly added. Thereupon, the mass is boiled for 30 hours in a reflux apparatus and subsequently evaporated to dryness. The properties of the product correspond with those of the product obtained according to Example 1.

(5) The reaction disclosed in Example 4 may be modified by heating the mixture, after the addition of the caustic soda solution, in a baking oven for about 10 hours at 160° C. to 170° C.

(6) The reaction between stannous chloride and sulfur monochloride is carried out as described in Example 4. After the caustic soda solution has gradually been added, the mass is slowly added drop by drop into 200 parts of boiling tetrahydronaphthalene and, simultaneously, the water is distilled off. Thereupon, heating is continued for 15 hours in a reflux apparatus. The gray product, thus obtained, is soluble in water.

(7) A solution of 20 parts of stannic chloride in 50 parts of sulfur monochloride is slowly added drop by drop to the molten mixture of 45 parts of beta-naphthol and 10 parts of phenol, the whole is then stirred for some time. Thereupon, 120 parts of caustic soda solution of 33% strength are added and the whole is boiled in a reflux apparatus for a prolonged time and subsequently evaporated to dryness.

(8) 20 parts of crystallized stannous chloride are dispersed in 54 parts of molten phenol; to this mixture there are slowly added, drop by drop, 70 parts of sulfur dichloride. The mass is stirred for some time; thereupon, 105 parts of caustic soda solution of 32% strength are introduced into the mass, drop by drop, the whole is boiled for 15 hours in a reflux apparatus and subsequently evaporated to dryness. The product obtained has properties similar to those of the product obtained according to Example 1.

(9) 20 parts of tin powder are dispersed in 54 parts of molten phenol; 70 parts of sulfur monochloride are slowly added to this mixture. Thereupon, 82 parts of caustic soda solution of 41% strength are added drop by drop, the whole is slowly heated to 160° C. to 170° C. and this temperature is maintained for 10 hours.

(10) 54 parts of phenol are molten and 20 parts of crystallized stannous chloride are added thereto, while stirring. 50 parts of sulfur monochloride are introduced drop by drop into the mixture. After the mass has been stirred for some time in the heat, a solution of 70 parts of sodium carbonate (or the corresponding quantity of sodium phosphate or caustic soda solution and sodium phosphate etc.) dissolved in 150 parts of water, is gradually added. The whole is boiled for about 20 hours in a reflux apparatus, it is allowed to cool, the resin-like product is separated from the liquor covering it and dried.

(11) At about 60° C. to about 70° C., 20 parts of stannic chloride are introduced, drop by drop, into the resin like condensation product, prepared from 54 parts of phenol and 50 parts of sulphur monochloride, the whole is stirred for some time and, thereupon, 110 parts of caustic soda solution of 33% strength are added. The mixture, thus obtained, may directly be used for resist purposes.

We claim:

1. Metal-containing, non-dyeing thio-derivatives being mordants for fixing basic-dyes on cotton and being suitable for use as resist agents for preventing silk and wool from taking up dyestuffs, which compounds are obtainable by a process which comprises causing a halogen-sulfur compound to react with a compound of the group consisting of phenols, naphthols and homologues and substitution products thereof in the presence of a substance of the group consisting of tin, antimony, and tin and antimony compounds.

2. Metal-containing, non-dyeing thio-derivatives being mordants for fixing basic dyes on cotton and being suitable for use as resist agents for preventing silk and wool from taking up dyestuffs, which compounds are obtainable by a process which comprises causing a substance of the group consisting of tin, antimony, and tin and antimony compounds to react with a condensation product from a halogensulfur compound and a compound of the group consisting of phenols, naphthols, and homologues and substitution products thereof.

3. Metal-containing, non-dyeing thio-derivatives being mordants for fixing basic dyes on cotton and being suitable for use as resist agents for preventing silk and wool from taking up dyestuffs, which compounds are obtainable by a process which comprises causing sulfur monochloride to react with a compound of the group consisting of phenols, naphthols, and homologues and substitution products thereof in the presence of a substance of the group consisting of tin, antimony, and tin and antimony compounds, and treating the thus obtained condensation product with aqueous alkalies.

4. Metal-containing, non-dyeing thio-derivatives being mordants for fixing basic-dyes on cotton and being suitable for use as resist agents for preventing silk and wool from taking up dyestuffs, which compounds are obtainable by a process which comprises causing about 50 to about 70 parts of sulfur monochloride to react with about 54 parts of phenol in the presence of about 20 parts of a chloride of tin and subjecting the condensation products obtained to the action of an aqueous caustic alkali solution.

5. The condensation product obtainable by introducing about 70 parts of sulfur monochloride into a mixture of about 54 parts of phenol and about 20 parts of stannous chloride, warming the mixture for some time to about 50° C. to about 100° C., adding about 100 parts of a 35% aqueous solution of caustic soda, and boiling the mass for about 30 hours, the said product being soluble in water, being a mordant for fixing basic dyes on cotton and being suitable for use as a resist agent for preventing silk and wool from taking up dyestuffs.

6. The process which comprises causing a halogensulfur compound to react with a compound of the group consisting of phenols, naphthols, and homologues and substitution products thereof in the presence of a substance of the group consisting of tin, antimony, and tin and antimony compounds.

7. The process which comprises causing sulfur monochloride to react with a compound of the group consisting of phenols, naphthols and homologues and substitution products thereof in the presence of a substance of the group consisting of tin, antimony, and tin and antimony compounds, and treating the thus obtained condensation product with aqueous alkalies.

8. The process, which comprises causing sulfur monochloride to react with phenol in the presence of a chloride of tin and subjecting the condensation product thus obtained to the action of an aqueous caustic alkali solution.

9. The process which comprises causing about 50 to about 70 parts of sulfur monochloride to react with about 54 parts of phenol in the presence of about 20 parts of a chloride of tin at a temperature of about 50° C. to about 100° C., adding thereupon about 100 parts of a 35% aqueous solution of caustic soda and boiling the whole for about 30 hours.

ERNST RÜNNE.
KARL LARBIG.